Patented May 7, 1940

2,199,933

UNITED STATES PATENT OFFICE 2,199,933

FABRIC WATERPROOFING COMPOSITION

Norman N. Gay, Berkeley, Calif., assignor to Standard Oil Company of California, San Francisco, Calif., a corporation of Delaware No Drawing. Application August 21, 1937, Serial No. 160,307

10 Claims. (Cl. 134—15)

This invention relates to a waterproofing and weatherproofing composition for fabric, particularly canvas and the like, that will remain resistant to sunlight, rain, and temperature extremes for long periods.

Heretofore the most successful waterproofing materials for this purpose have been the true waxes, gums, resins, etc., although they offered many disadvantages due to stiffening, discoloration, and the like. Mineral waxes, which are not true waxes, have ordinarily been avoided, particularly because of the rapid loss of tensile strength of fabrics treated with them when exposed to atmospheric conditions. The disadvantages of mineral waxes have been overcome by this invention so that the tensile strength of the treated fabric is actually increased over its untreated condition, and the material remains soft and pliable, does not discolor from sunlight, and retains its waterproof properties for a matter of years instead of months.

The new composition is preferably made of scale wax, amorphous wax, aluminum palmitate, a highly viscous polymerized olefin and a volatile solvent, to which may be added a filler or pigment such as finely ground whiting. The invention also includes the method of preparing such a composition, as will be disclosed in greater detail below.

The particularly novel and important feature of the invention is believed to be the blending of the mineral waxes and other materials with the viscous polymerized olefin, which latter is a true liquid at all ordinary temperatures and does not have the characteristics of either the viscous solids or of viscous solids dissolved in liquid hydrocarbons heretofore used in this art. The viscous polymerized olefin or olefin polymer is also substantially inert and substantially non-drying. One group of viscous polymers that may be used are those produced by the polymerization of normally gaseous mono-olefins, such as the butenes, by catalytic contact with aluminum chloride, and which have a viscosity in the neighborhood of 3000 Saybolt seconds Universal at 210° F. Such a constituent is substantially inert and maintains the composition in a soft and plastic condition substantially indefinitely, at least during a period of years. Any decomposition products from exposure of the composition to the weather do not cause deterioration of the fabric, and apparently add to the waterproofing qualities, so that the latter qualities have been found actually to improve upon exposure.

The mineral waxes are believed to be permanently softened or plasticized by blending with the viscous polymer and the waterproofing qualities are improved by the addition of a material such as aluminum palmitate. The mixture is made liquid and usable at ordinary temperatures by the addition of the volatile mineral petroleum thinner.

The production of the composition is preferably carried out by heating and stirring the olefin polymer and mineral waxes at the melting point of the latter, or about 160°–170° F. until all the wax is melted and blended with the polymer, after which the batch is cooled to about 140° F. The aluminum palmitate is added and the mixture heated to about 240° F. and stirred until a gel is formed. This is cooled to about 190° F. and the volatile solvent or thinner added, after which the whole is cooled and stirred until the gel is broken. The pigment or filler, which may be a mineral such as finely powdered and bolted whiting, may then be added, and will be found to improve the weatherproofing properties of the material, particularly when applied to canvas.

The waterproofing material may be stored and shipped in tin lined steel containers and is applied to the fabric by spray painting or brushing or by impregnation. The volatile solvent, which is merely present to facilitate an even, thin application, evaporates readily and leaves the waterproofing residue in the fabric.

A preferred composition is approximately as follows:

| | Percent by weight |
|---|---|
| Scale wax (M. P. 122°–124° F.) | 10.5 |
| Amorphous wax (M. P. 160°–170° F.) | 4.5 |
| 3000 vis. polymers | 3.0 |
| Aluminum palmitate | 1.5 |
| Petroleum thinner (B. P. 200°–400° F.) | 80.5 |
| | 100.0 |

If a filled or pigmented product is desired, the following composition may be used:

| | Percent by weight |
|---|---|
| Waterproofing material as above | 85 |
| Bolted whiting | 15 |
| | 100 |

Although specific materials and proportions thereof as well as one specific mode of procedure are disclosed above, it is obvious that modifications and changes may be made without departing from the invention, as is embraced and defined by the following claims.

I claim:

1. A waterproofing composition comprising the following ingredients in approximately the following proportions by weight:

| | Percent |
|---|---|
| Scale wax | 10.5 |
| Amorphous hydrocarbon wax | 4.5 |
| Viscous liquid hydrocarbon polymers | 3.0 |
| Aluminum palmitate | 1.5 |
| Volatile hydrocarbon thinner | 80.5 |
| | 100.0 |

2. A waterproofing composition according to claim 1, to which has been added whiting in the proportions of about 85 parts of composition by weight to 15 parts of whiting by weight.

3. The process of preparing waterproofing compositions which comprises admixing a mineral hydrocarbon wax and a viscous liquid olefinic hydrocarbon polymer at a wax-melting temperature, adding aluminum palmitate, heating to a temperature sufficient to form an aluminum palmitate-hydrocarbon gel, cooling, adding a volatile hydrocarbon thinner, and stirring the resulting admixture until the gel is broken and a homogeneous mobile fluid composition is obtained.

4. The process of preparing waterproofing compositions which comprises admixing amorphous and crystalline hydrocarbon waxes and a viscous liquid olefinic hydrocarbon polymer at a wax-melting temperature, adding aluminum palmitate, stirring and heating to a temperature of about 240° F. until an aluminum palmitate-hydrocarbon gel is formed, cooling to about 190° F., adding a volatile hydrocarbon thinner, and stirring the resulting admixture until the gel is broken and a homogeneous mobile fluid composition is obtained.

5. A liquid waterproofing composition comprising a mineral hydrocarbon wax, a substantially non-drying and highly viscous liquid olefin polymer in proportion by weight less than that of said wax but sufficient to substantially permanently soften and plasticize said wax, and a volatile hydrocarbon thinner, said waterproofing composition upon evaporation of said thinner leaving a coating which remains soft and plastic for a relatively long period of time.

6. A liquid waterproofing composition comprising a mineral hydrocarbon wax, a substantially non-drying and highly viscous liquid olefin polymer in proportion by weight less than that of said wax but sufficient to substantially permanently soften and plasticize said wax, aluminum palmitate also in proportion less than that of said wax, and a volatile hydrocarbon thinner, said waterproofing composition upon evaporation of said thinner leaving a coating which remains soft and plastic for a relatively long period of time.

7. A liquid coating composition as defined in claim 5 in which said hightly viscous liquid olefin polymer has a viscosity of approximately 3,000 seconds Universal Saybolt at 210° F.

8. A liquid coating composition as defined in claim 6 in which said highly viscous liquid olefin polymer has a viscosity of approximately 3,000 seconds Universal Saybolt at 210° F.

9. A liquid coating composition as defined in claim 5 in which said wax is amorphous.

10. A liquid coating composition as defined in claim 5 in which said mineral hydrocarbon wax comprises an amorphous mineral hydrocarbon wax and a crystalline hydrocarbon wax.

NORMAN N. GAY.